United States Patent

Lee, Jr. et al.

[15] 3,707,605

[45] Dec. 26, 1972

[54] AUTOMATIC CALL-BACK INCLUDING SIMPLIFIED STORAGE AND SCANNING

[72] Inventors: Ernest O. Lee, Jr.; John A. Adams, Jr., both of Fairport, N.Y.

[73] Assignee: Stromberg-Carlson Corporation, Rochester, N.Y.

[22] Filed: Jan. 27, 1971

[21] Appl. No.: 110,112

[52] U.S. Cl. ........................................ 179/18 BG

[51] Int. Cl. ........................................ H04m 3/48

[58] Field of Search ....179/18 B, 18 E, 18 ES, 18 BG

[56] References Cited

UNITED STATES PATENTS

| | | | |
|---|---|---|---|
| 3,553,385 | 1/1971 | Morgan et al. | 179/18 BG |
| 2,921,138 | 1/1960 | Baker et al. | 179/18 BG |
| 3,492,433 | 1/1970 | Duft et al. | 179/18 BG |

*Primary Examiner*—Thomas W. Brown
*Attorney*—Craig, Antonelli, Stewart & Hill

[57] ABSTRACT

Automatic call-back system for automatic telephone exchanges which permits calling party to make another call while call-back is in effect without abandoning this feature, and also permits the setting up of the call-back feature after a called subscriber number has been dialed and without the need to re-dial such number subsequent to the dialing of a special call-back digit, including the provision of a storage unit capable of simultaneously storing a plurality of pairs of calling and called subscriber numbers in respective storage locations, store control means associated with each storage location for indicating whether data is stored therein and scanning means for periodically scanning said store control means.

23 Claims, 7 Drawing Figures

PATENTED DEC 26 1972 3,707,605

INVENTORS
ERNEST O. LEE, JR.
JOHN A. ADAMS, JR.

BY Craig, Antonelli, Stewart & Hill

ATTORNEYS

AUTOMATIC CALL-BACK INCLUDING SIMPLIFIED STORAGE AND SCANNING

The present invention relates to an automatic call-back system for automatic telephone exchanges, and particularly for a private branch automatic exchange.

One of the special features which has been provided in connection with automatic telephone systems aids the subscriber in establishing a connection with a busy line circuit without requiring repeated dialing of the subscriber number of that line circuit. This feature, commonly referred to as "Call-Back", is particularly useful in connection with PBX systems which are principally used in business offices where the efficient use of time by the subscribers is important.

The "Call-Back" feature, to which the present invention is directed, relates to the establishment of a communication connection between subscribers within the PBX system. In the conventional system, if the calling subscriber receives a busy indication upon dialing the number of a called subscriber within the system, he may establish the special call-back feature by replacing his handset, removing the handset once again, dialing a special digit representing the call-back feature and then dialing the subscriber line number. The calling subscriber may then replace his handset and once the called party is free, both parties are rung simultaneously.

The conventional systems which include automatic call-back generally have several inherent features which are disadvantageous. For example, it is a characteristic of the conventional call-back arrangement that the established call will be abandoned if the calling party goes off hook after establishment of the special feature. In other words, upon replacing his handset after initiating the call-back procedure, the calling party cannot make or receive another call without abandoning the call-back equipment. This unnecessarily ties up the businessman, for example, thereby defeating the basic purpose of the call-back feature.

A second disadvantage of the conventional system resides in the requirement that the calling party dial the special digit initiating the call-back procedure prior to the dialing of the called subscriber line number. This means that a subscriber who has dialed the line number of another party to the system only to find the line circuit busy must replace his handset or flash the hook switch so as to once again receive dial tone enabling him this time to dial the special call-back digit prior to the dialing of the called subscriber line number. The result is another waste of time which defeats the basic purpose of the call-back function.

It is therefore an object of the present invention to provide in a private automatic branch exchange an automatic all-back feature which avoids the disadvantages inherent in known systems providing such a feature.

It is another object of the present invention to provide a telephone system of the type described including automatic call-back equipment which requires a minimum of operation by the calling subscriber to establish a connection to the called subscriber.

It is a further object of the present invention to provide a telephone system of the type described including automatic call-back equipment, which permits the calling subscriber to utilize his equipment to establish and receive other calls after the automatic call-back feature has been initiated without abandoning that feature.

It is still another object of the present invention to provide a telephone system of the type described including automatic call-back equipment which prevents establishment of the connection between a calling and called subscriber until both parties are available.

In accordance with one feature of the present invention, after the calling subscriber has dialed another party within the PABX system and has received busy tone indication that the called line circuit is occupied, he may establish the call-back feature simply by dialing a special digit representing that feature. The recognition of this special digit by the system immediately effects connection of special call-back equipment within the common control and initiates the call-back operation. The calling party need not dial the line number of the called party a second time and may replace his handset once the special digit has been dialed. In this way, it is unnecessary for the calling subscriber to replace and then lift his handset so as to dial the special feature digit before dialing the line number of the called party. The result is a considerable saving in time and effort on the part of the calling subscriber, who need dial the number of the called subscriber only once, which is the basic purpose of call-back equipment.

In accordance with another feature of the present invention, once the call-back feature has been initiated within the system including the present invention and the calling party has replaced his handset, he may utilize his equipment either to establish another call or to receive a call without effecting abandonment of the special call-back feature which he has established. This is possible in accordance with the present invention because the system periodically checks both the calling and the called line circuit and will attempt to establish a communication connection therebetween only when both line circuits are available. Thus, if the calling subscriber establishes a second call while the special call-back feature is in process, the system will wait until that call has been completed before establishing the call-back connection, unless the second call established by the calling party exceeds a certain time limit.

An additional feature of the present invention resides in the fact that the call-back connection between the calling and called subscribers will not be effected until the calling subscriber has responded to the call-back ring. Thus, once the system in its periodic check determines that both the calling and called line circuits are available, the calling party is rung first and then the called party is rung only after the calling party has answered. In this way, if the calling party who has established the call-back feature leaves the area of his telephone equipment with the intent of abandoning the call, the called party will not be unnecessarily disturbed by the ringing of his phone, even though the telephone equipment determines that both line circuits are available. This will eliminate the possibility that the called subscriber will answer a ring of his telephone only to find no one on the line. Thus, the present invention prevents the ringing of the called subscriber equipment if the calling subscriber is no longer available.

These and other objects, features and advantages of the present invention will become more apparent from the following detailed description thereof, when taken in conjunction with the accompanying drawings, which illustrate one embodiment of the present invention, and wherein.

The principles of the present invention are described in detail below in association with an exemplary PBX telephone system of the common control type. Since the present invention is not restricted to use in association with this or any one other particular telephone system, it should be understood that the specific telephone system described herein is presented only for purposes of facilitating an understanding of the basic principles of the invention. Accordingly, only those detailed features of the disclosed common control telephone system which are important to the operation of the present invention have been described in detail.

GENERAL SYSTEM DESCRIPTION

Figure 1:
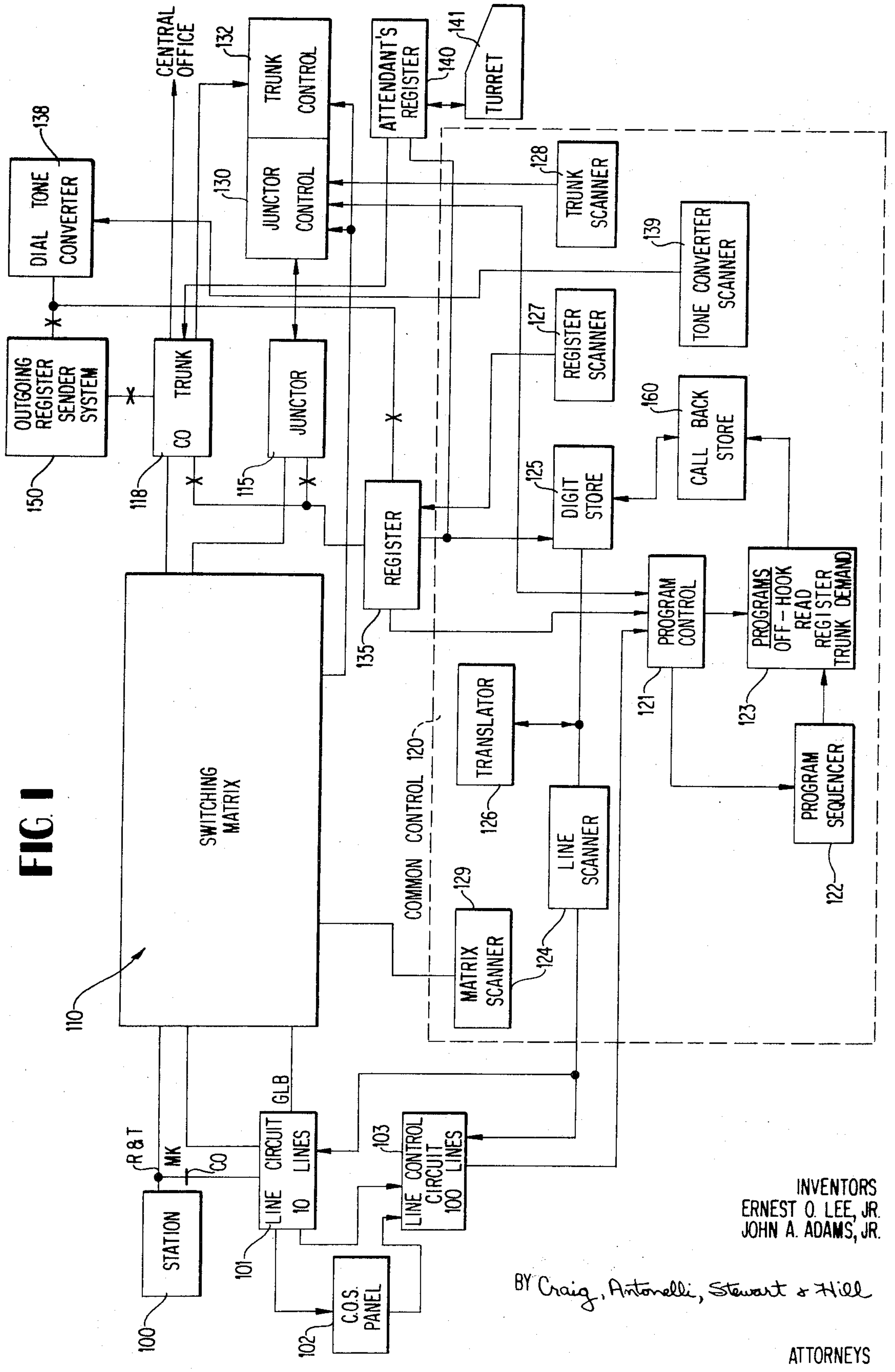
FIG. 1 is a schematic block diagram of a PABX common control telephone system including the automatic call-back equipment of the present invention.

FIG. 1 illustrates an overall block diagram of a common control PBX system capable of connecting one station to another station or to the central office via a trunk circuit under control of the common control circuits. The system provides a plurality of stations 100 (of which only a single station is illustrated in FIG. 1 for purposes of simplicity) with each group of 10 stations 100 being serviced by a line circuit 101 associated with a particular input of the switching matrix 110. The switching matrix 110 is a typical matrix network formed of three stages of reed relay switches providing a plurality of paths between a given input connected to one of the plurality of stations 100 and a given output connectable to a junctor 115 or central office trunk 118. All of the switching functions of the system are controlled by common control circuits 120 which perform the functions for an offhook program, a read register program and a trunk demand program. One or more junctor controls 120 and trunk controls 132 along with a plurality of registers 135 are also provided for purposes of effecting connection of a particular station requiring service to the common control equipment so that the operations necessary to the establishment of a communication connection within the PBX or outside thereof to the central office may be performed. A class of service panel 102 is provided for each group of 100 lines and indicates for the respective stations served by the line circuit special classes of service which are available for the stations and particular equipment which may be available or used thereby, such as tone-dial equipment as opposed to rotary dial.

The common control 120 is divided into several separate functional circuits which serve to control the program of operations carried out to perform the switching processes including the path checking and selection required for connection of a station requesting service to a register or central office trunk. A line control circuit 103 accommodating 100 line circuits 101 serves as an interface between the common control 120 and the individual line circuits 101. The common control 120 typically includes a program control 121 which selects the program to be run to satisfy the request for service and a program sequencer 122 and a program circuit 123, which implement the program selected by the program control 121. The program control 121, program sequencer 122 and program circuit 123 may typically take the form of a wired logic or other programmed system of the type well known in the art. The various control signals eminating from this program control area of the common control 120 have not been illustrated in detail since the arrangement and functioning of such elements do not directly relate to the present invention and such systems are conventionally provided in several forms in the known prior art.

The common control 120 also includes a line scanner 124 which determines the line demanding service on an originating call and identifies and acts as a line marker when terminating a call. A digit store 125 and a translator 126 are also provided as part of the common control 120 and serve the functions normally associated with such elements, the digit store 125 being associated with the call-back store 160 which forms the substance of the present invention. A register scanner 127 examines the status of the registers and register senders to determine if an idle register or outgoing register sender is available for use in connection with a calling station or to find the register demanding service to complete a call. A trunk scanner 128 and matrix scanner 129 are associated with the path selecting and checking operation performed in connection with the switching matrix 110, the trunk scanner 128 serving to scan the junctions 115 and central office trunks 118 through the junctor control 130 or trunk control 132 to determine those which may be available to a calling station through the switching station 110. The matrix scanner 129 serves to scan the links in the switching matrix 110 in the process of establishing a path from a given calling station through the switching matrix, in accordance with a system disclosed in copending application Ser. No. 37,772, filed May 15, 1970, now U.S. Pat. No. 3,660,600, in the name of Ernest O. Lee, Jr., and assigned to the same assignee as the present application. This copending application also includes a detailed description and illustration of the switching matrix 110 and the various elements including the junctor control 130 and trunk control 132 along with other elements required for the path-finding operation.

In order to provide attendant service in the system, an attendant's register 140 and turret 141 are connected to the central office trunks 118 and registers 135 to provide service for incoming and outgoing calls. Also associated with the central office trunks 118 is an outgoing register sender system 150, such as disclosed in copending application Ser. No. 57,550, filed July 23, 1970, now U.S. Pat. No. 3,671,677, in the name of Ernest O. Lee, Jr. and John A. Adams, Jr., and assigned to the same assignee as the present application.

Typical operation of the system of FIG. 1 is initiated by a subscriber at a given station 100 lifting the handset of his telephone, which results in the closing of a direct current loop to the tip T and ring R leads of the line thereby signaling the associated line circuit 101 of the demand for service. The demand is placed through the associated line control circuit 103 to the common control 120 for an offhook program, and the common control causes the line scanner 124 to scan over the lines to identify the particular line requesting service. Upon identifying the line requesting service, a class of service check is made through the COS panel 102 to determine if the line has a rotary dial class of service or a multifrequency class of service, information which is necessary to determine whether a tone dial converter 138 is necessary or not in the establishment of the call.

The common control 120 causes the line circuit 101 to place a negative potential mark on its mark lead, which is connected to an input of the switching matrix 110. The common control 120 then actuates the matrix scanner 129 initiating the path checking and selecting operation which will select a single path through the switching matrix 110 from the station 100 requesting service. The common control also causes the trunk scanner to scan over the junctors, through the junctor control, for an idle junctor and the register scanner to select an idle register. The cross points of the selected matrix path are operated at this time connecting the calling line through the junctor to the selected register. Dial tone is returned to the calling line from the register through the switching matrix, and at this time, the common control releases and is available to handle other requests for service.

After receiving dial tone, the subscriber dials one or more digits which are received and stored in the register. The common control analyzes the dialed digits as they are received to determine whether the call to be established is a local call, an outgoing trunk call or a special request for service. If the dialed digits represent a local call within the system, the register calls in the common control for service. The common control starts the register scanner 127 scanning for the register requesting service. When the register has been found, the digits which have been stored in the register are passed to the digit store 125 in the common control. The digit store passes this information to the line scanner 124 which marks the desired line and the line is checked to see if it is idle or busy. If the line is idle, the common control calls in the matrix scanner to establish a path from the junctor to the called line. The path through the switching matrix is closed and ringing is applied to the respective lines from the junctor. The common control releases making it available to serve other requests for service.

If at the time the called line is checked it is found busy, the common control makes a class of service check to determine if the calling line has the proper class of service to initiate a call-back function and releases. Busy tone is returned to the calling telephone from the junctor. The common control instructs the register to remain connected to the junctor and anticipate another digit. In doing so, the register must empty its storage facilities (erase the called subscriber's number). If the calling subscriber has a class of service which includes automatic call-back, he may at this time dial or tone a special digit, such as 9, to establish the call-back function. Upon receipt of this digit in the register, the register will pass the digit to the digit store in the common control. Two separate line scans are then initiated to identify first the called subscriber line number and then the calling subscriber line number. When each number is obtained it is then transferred from the line scanner to the digit store and call-back store and the call-back procedure is initiated under control of the program control circuitry in the common control. Busy tone is now removed from the calling line and the calling party may replace his handset and wait until the call is established. The system now automatically attempts to establish the requested connection between the subscribers by checking to see if both lines are idle, and if so, by ringing first the calling line, and once he answers, the called line. The system will attempt to make this connection once every minute for 15 minutes and if not successful within the 15-minute period, the stored information will be automatically erased.

CALL-BACK STORE

The call-back store is capable of storing four calling and four called four-digit subscriber numbers, and serves to periodically apply the stored numbers to the digit store for purposes of testing the calling and called lines to determine their busy-free condition. Thus, the call-back store provides a timing function in that it automatically controls the periodic testing of the calling and called line circuits in accordance with the numbers stored therein.

Figure 2:
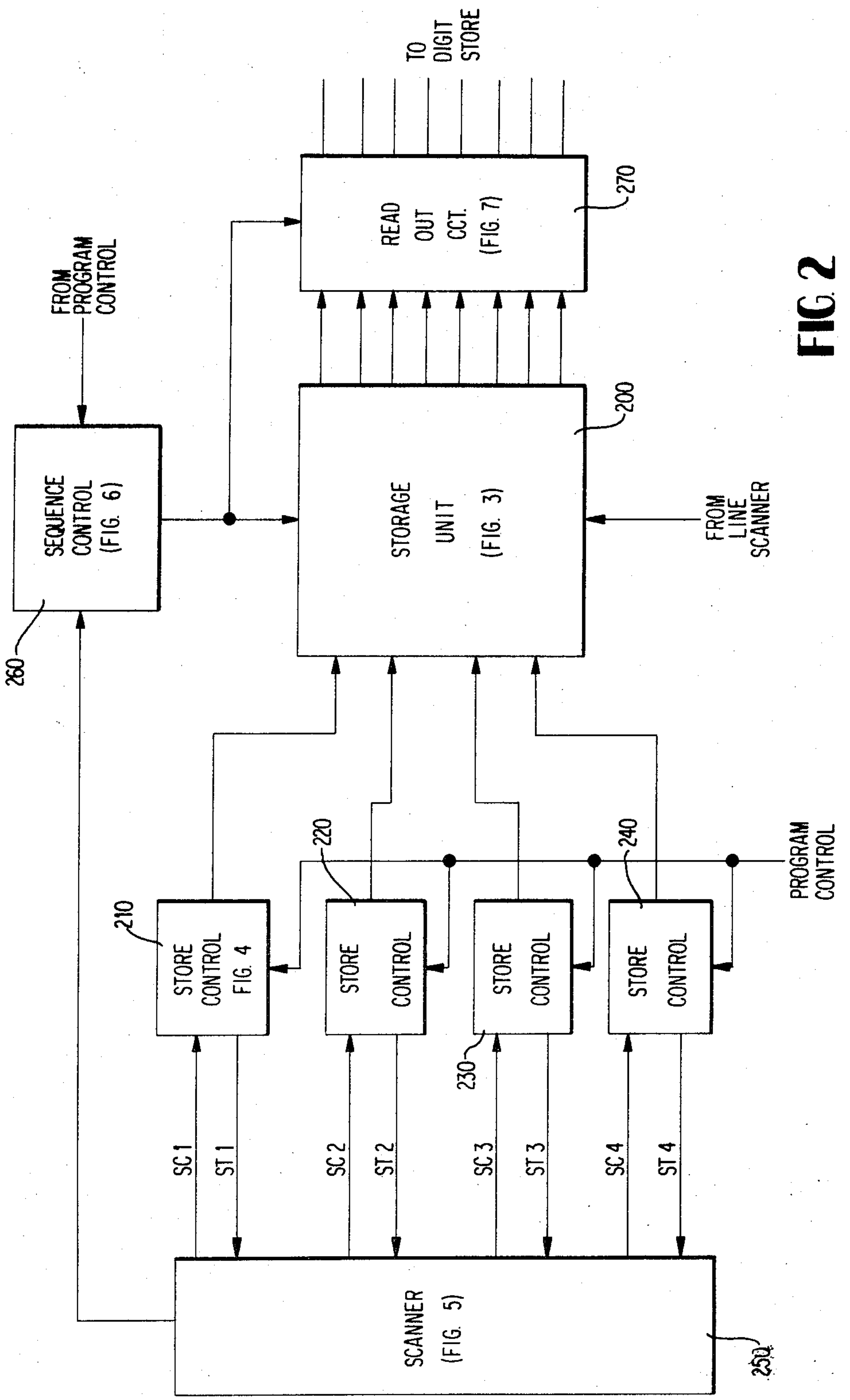
FIG. 2 is a schematic block diagram of the call-back store in accordance with the present invention.

FIG. 2 shows a basic block diagram of the call-back store 160, which includes as a basic element a storage unit 200 capable of storing four combinations of calling and called line numbers. Associated with the storage unit 200 are four store controls 210, 220, 230 and 240, each of which monitors one of the individual storage areas in the storage unit assigned to one combination of calling and called line numbers. The store controls 210–240 indicate whether data is or is not stored in the respective location to which it is assigned, thereby providing information to the program control, when data is stored in the storage unit 200, that a call-back program is required, and indicating to the program control that data relating to call-back may be stored, when one of the areas of the storage unit is empty.

A scanner 250 under control of the program control scans the store controls 210–240 to extract therefrom information concerning the area of storage unit 200 to which the respective store controls are assigned. Where a given store control indicates to the scanner that the storage unit is available for storing data or reading out data as required by the program control, a sequence control 260 is actuated from the scanner and under control from the program control serves to either read out or store data in the particular storage area represented by the store control in a given sequence. In the case of read out of information, the data from the store unit 200 is shifted to a read out circuit 270, which under control of the sequence control 260 shifts the data to the digit store.

When a call back digit has been dialed by a calling subscriber having the proper class of service, the line number of the calling subscriber is supplied to the call-back store from the line scanner 124 where it is stored in one selected area of the storage unit 200. The area in which this data is stored is determined by a scanning of the store controls 210–240 in response to actuation thereof by the program control. When the scanner detects a store control indicating an available storage area in the storage unit 200 the scanner stops and actuates the sequence control 260, which proceeds to steer the digits making up the calling subscriber line number from the line scanner into the storage area available in the storage unit. In the same manner, the called subscriber line number is also received from the digit store 125 via the line scanner 124 and stored in the same storage area under the control of the sequence control 260.

As long as data is stored in the storage unit 200, the program control will be notified from the store control associated with that storage area of a call-back demand so that the scanner 250 will be operated to scan the various store controls 210–240. Once each minute, the data stored in each storage area of the storage unit 200, as indicated by the associated store control, will be gated through the read out circuit 270 to the digit store 125, from which it will be applied to the line scanner 124 to test the calling and called subscriber lines for a busy-free condition. If either or both line circuits are busy, the system will continue to test the line circuits once each minute until the circuits are available to establish a connection. Once a connection is established, the store control associated with that area of the storage unit is actuated to indicate the availability of the store area, thereby permitting additional data to be stored in that area and preventing further read out of the data in that area for purposes of establishing a connection.

Figure 3:
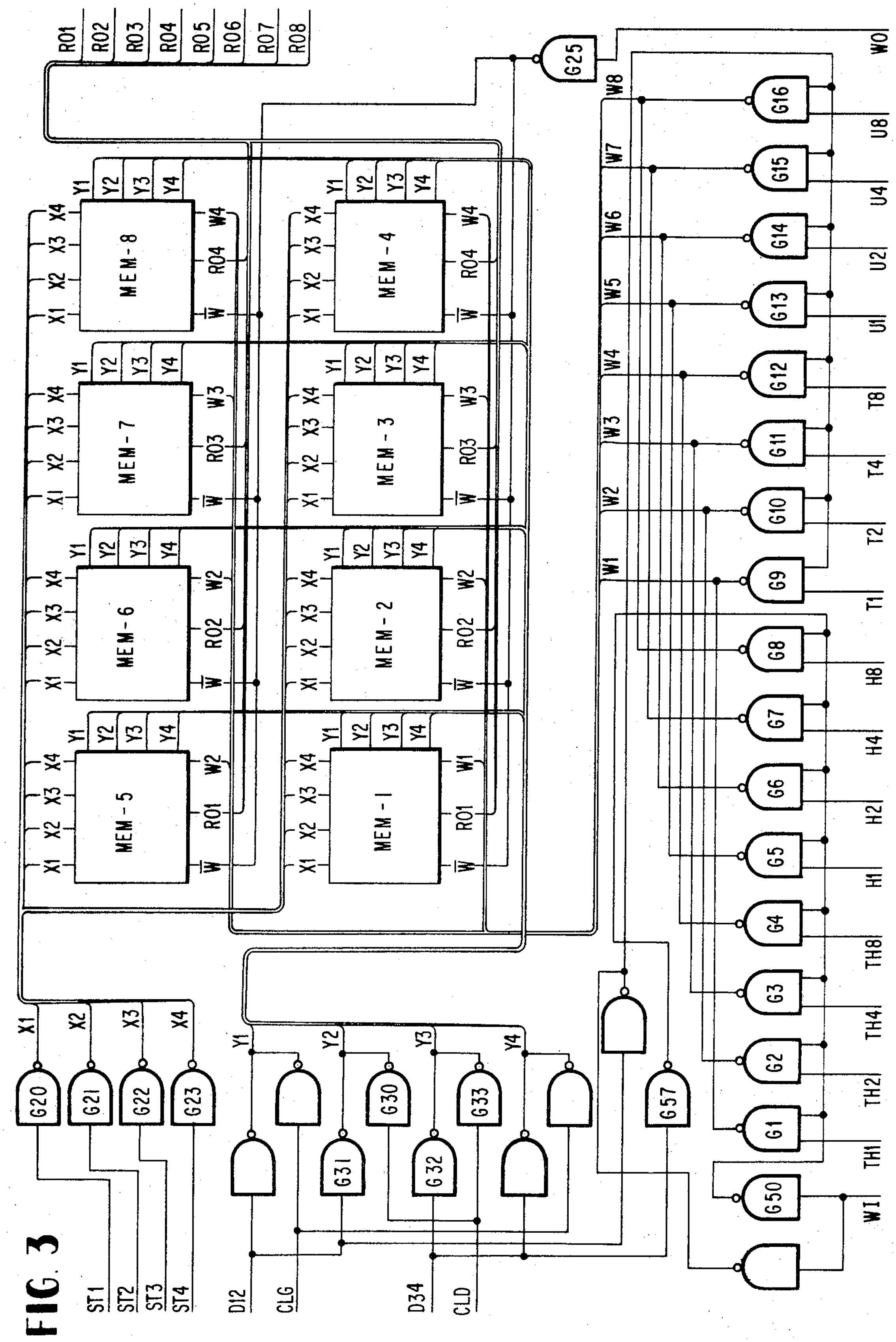
FIG. 3 is a schematic circuit diagram of the storage unit.

The details of the storage unit 200 are illustrated in FIG. 3. The circuit consists of eight memory chips MEM-1 through MEM-8, which are of the commercially available integrated circuit type, each chip being capable of storing sixteen bits of data at locations designated by the respective X and Y locations thereof. A four-digit number to be stored in the eight memory chips appears in binary-coded-decimal form at the inputs to AND gates G1 through G16 from the line scanner. The leads TH1, TH2, TH4 and TH8 represent the thousands digit; the leads H1, H2, H4 and H8 represent the hundreds digit; the leads T1, T2, T4 and T8 represent the tens digit; and the leads U1, U2, U4 and U8 represent the units digit. Since four originating and terminating line numbers are to be stored, each of the X runs in the memory chips represents one storage bin wherein an originating and terminating number can be stored. These storage bins are accessed by leads ST1, ST2, ST3 and ST4 via gates G20–G23, respectively. In order to store data in a memory chip, one X and one Y lead must be simultaneously energized and the data must be applied to one of the W leads of the chip. Each chip has a W lead to write a binary "one" into a memory location and a W lead to write a binary "zero" into a memory location. In actuality, prior to storage of numbers in storage areas designated by one of the X runs controlled by one of the leads ST1 through ST4, an input WO is applied via gate G25 to write a binary "-zero" in all of the memory locations in the run associated with the particular X lead which is actuated. Then binary "ones" are inserted into those selected memory locations in accordance with the digit to be stored, thereby leaving the other memory locations at binary "zero".

The thousand and hundred digits of the calling number will be stored in locations Y1 and the tens and units digits will be stored in locations Y4. In the same manner, the thousand and hundred digits of the called number will be stored in the location Y2 and the tens and units digits of the called number will be stored in location Y3. Since there are eight memory chips MEM-1 through MEM-8, there are eight Y1 locations, eight Y2 locations, etc., thus in the selected storage bin designated by one of the X runs, there are 32 bits available for storage. This is just the right amount of storage space to store two four-digit numbers in binary-coded-decimal form. Since there are four X runs, each capable of storing a four-digit calling number and a four-digit called number, four calls may be stored at a time in the memory chips, each storage location of a call being accessed by the leads ST1 through ST4, respectively.

To store a binary one in a memory chip, the appropriate X and Y inputs have to be high (+5) as the lead WI goes high. Thus, when a given ST lead is selected, the associated X input goes high permitting storage in the X run of the memory chips by sequentially enabling the Y1 through Y4 leads associated with these chips. The number to be stored appears at the inputs to gates G1 through G16 in binary-coded-decimal form, where a binary "one" is represented by ground. The first number to be stored is the called number, thus ground is placed on lead CLD from the sequencer control 260. Next, lead D12 receives a ground from the sequencer signifying that digits 1 and 2 of the called number are to be stored. Ground on the leads CLD and the lead D12 applied through gates G30 and G3*p* place a high on lead Y2 for all eight memory chips. Assuming that lead ST1 receives ground indicating that the X1 run is to receive the data from the line scanner, all memory chips will have input X1 and input Y2 high. Before a number is stored, the store has to be cleared of previous data stored therein. This is performed by writing a binary zero in all of X1, Y2 locations as the control lead WO from the sequence control goes low for approximately 40 microseconds. Immediately thereafter, the control lead WI from the sequence control goes low enabling the input gates G1 through G8 as a result of the high provided at the outputs of gates G50 and G51. The eight bits received from the line scanner are thereby stored in the memory locations X1, Y2.

The lead D12 next goes high and the lead D34 goes low under control of the sequence control 260 which together with the low applied to lead CLD enables the Y3 inputs to all memory chips via gates G32 and G33. Here the sequence indicated above is repeated where WO goes low storing binary zeros in all X1, Y3 locations to clear the memory and when WI goes low, the data applied via gates G9 through G16 will be stored in the X1, Y3 locations of the memory chips.

The same sequence is repeated for storing the calling number, except that lead CLG will go low in place of lead CLD and the first two digits will be stored in the X1, Y1 locations while the remaining two digits will be stored in the X1, Y4 locations. To store a second pair of numbers, one of the other leads ST2 through ST4 is enabled and the sequencing of the Y1 through Y4 leads is carried out as described above. Once all memory locations are filled with data, representing four groups of calling and called subscriber numbers of four digits each, no more numbers can be stored without erasing one already stored. Erasing takes place every time a new number is to be stored.

The read out of data from the memory chips is carried out in a similar manner to the storage of data therein. If it is required to read out a stored number, the location of the calling and the called number will be accessed by selecting the X and the Y coordinates of the memory chips. The sequencing of the Y1 through Y4 leads in connection with the calling and called numbers in a given storage location is identical to the storage operation. One of the leads ST1 through ST4 designating the storage area containing the numbers to be read out is enabled. Then the lead CLD is enabled, along with lead D12 followed by lead D34. Next the lead CLG is enabled and leads D12 and D34 are enabled in sequence along therewith. However, in the case of read out a control lead RE from the sequencer, as seen in FIG. 7, is enabled rather than the lead WI associated with the write-in operation.

Figure 7:
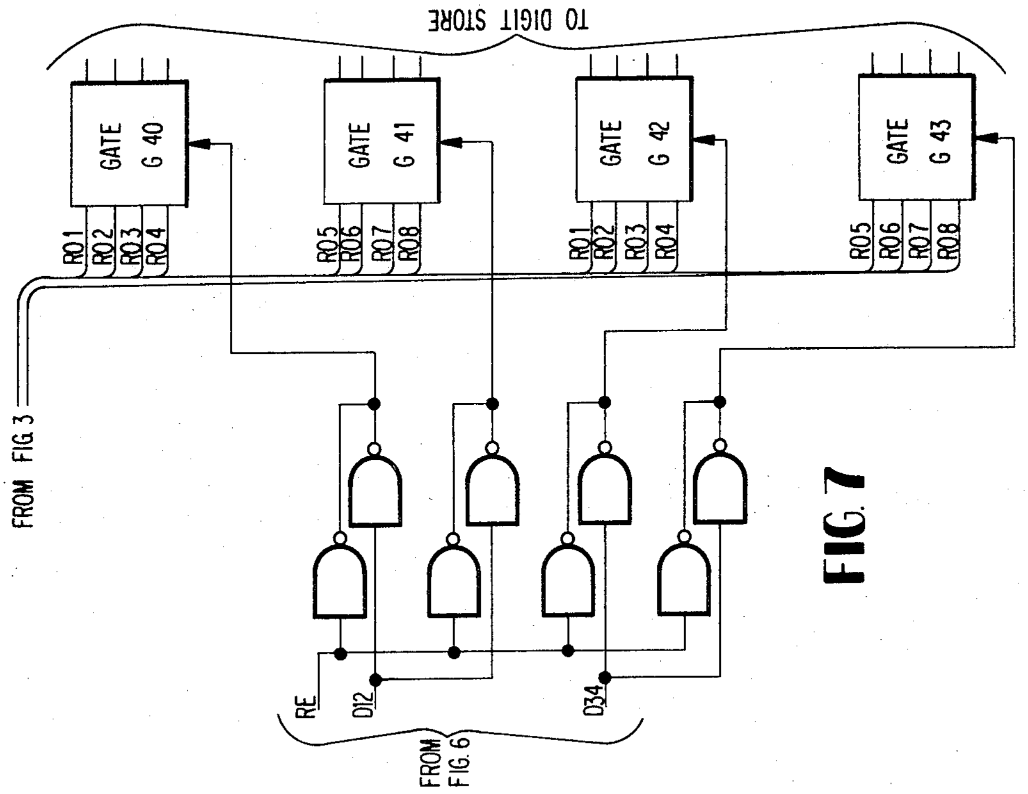
FIG. 7 is a schematic circuit diagram of the read-out circuitry.

The outputs from the memory chips MEM-1 through MEM-8 appear at leads RO1 through RO8 to inputs of gates G40 through G43 in FIG. 7. The first two digits of the called number are gated through gates G40 and G41 in response to the combined enabling of leads RE and D12, designating a read out of digits 1 and 2. The third and fourth digits of the called number are then read out of gates G42 and G43 in response to simultaneous enabling of leads RE and D34, designating read out of the third and fourth digits. The procedure is then repeated for the read out of the calling number. The outputs of gates G40 through G43 are applied to the digit store 125.

Figure 4:
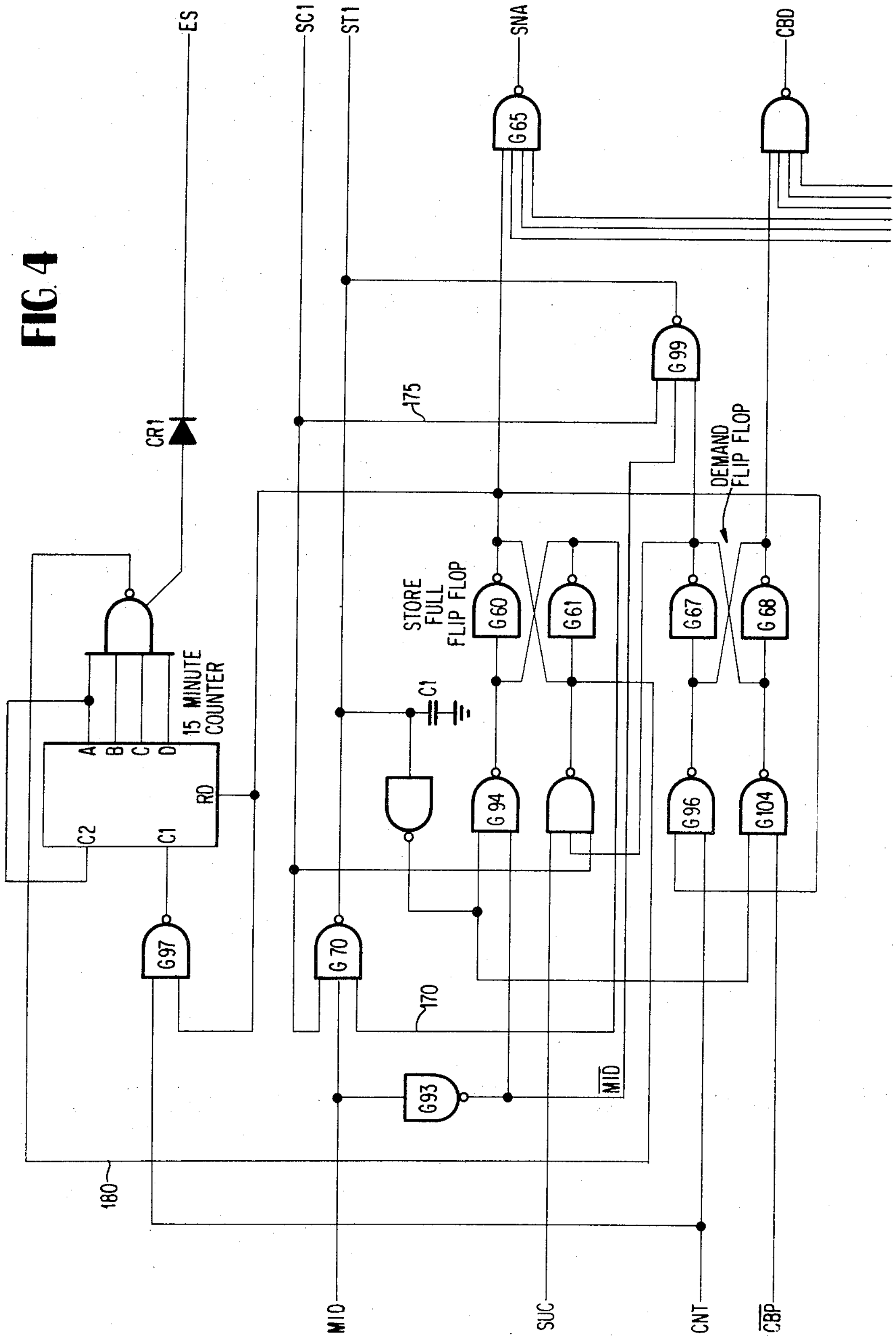
FIG. 4 is a schematic circuit diagram of one of the store controls.

A typical store control circuit is illustrated in FIG. 4. Each of the store control circuits 210–240 is associated with a respective one of the X runs of the memory and therefore controls the storage and read out of one set of calling and called line numbers. Thus, each of the store control circuits 210 through 240 controls one of the lines ST1 through ST4, respectively in the storage unit 200.

The store control circuit includes a STORE FULL FLIP-FLOP made up of gates G60 and G61, which indicates whether the particular storage area in the memory associated therewith has data stored therein. Thus, this flip-flop determines the availability of the storage area in the memory associated therewith, and when in the reset state provides a signal SNA via gate G65 to the program control indicating that a storage area is available to receive data.

Each store control circuit also includes a DEMAND FLIP-FLOP made up of gates G67 and G68, which when set, provides a signal CBD to the program control indicating that data is stored in the memory area associated with that store control. In this way, the program control knows that the call-back program must be carried out repeatedly until a connection is established or the call-back feature is abandoned. A fifteen-minute counter is also provided, which counter is advanced once each minute until it reaches the count of 15, at which time it automatically resets the STORE FULL FLIP-FLOP thereby making the storage area associated therewith available for the receipt of other data.

If the program control has been activated and attempts to store a calling and called number, ground will be placed on the lead MID of the store controls from the program control. However, this will happen only if the output SNA to the program control indicates that storage space is available in the call-back store. Depending upon the space available, the gate G70 in one or more store control circuits will be enabled by the ground on lead MID.

Figure 5:
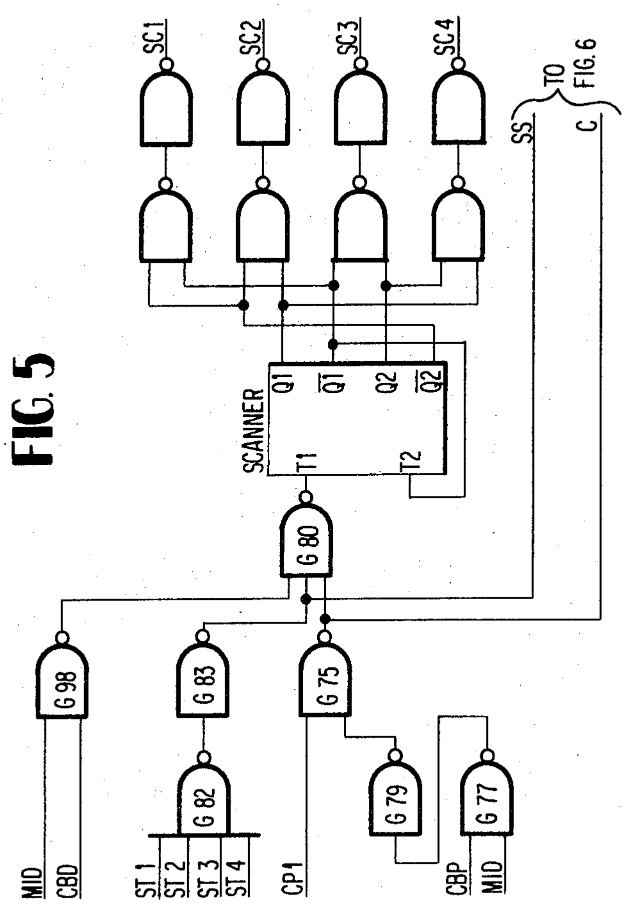
FIG. 5 is a schematic circuit diagram of the scanner.

To select one of the storage areas which is available in the storage unit, the scanner 250, illustrated in FIG. 5, is actuated by ground being placed from the program control on lead CBP along with the ground on lead MID to the gate G75 via gates G77 and G79. The enabling of gate G75 permits clock pulses on line CP1 to pass gate G80, thereby advancing the scanner. The scanner consists of a standard counter circuit which provides successive outputs on lines SC1 through SC4.

Each of the signals SC1 through SC4 is applied in sequence to one of the respective store control circuits 210 to 240. As seen in FIG. 4, when the SC1 finds the gate G70 enabled by the ground applied to control lead MID, at the same time that the STORE FULL FLIP-FLOP is reset, indicated by the ground on line 170, the ST1 signal will be generated and applied to the storage unit 200 to enable storage of data in one of the storage bins thereof. The ST1 pulse is also applied back to the scanner via gates G82 and G83 to inhibit the gate G80, thereby preventing further clock pulses from advancing the scanner. At the same time, a signal will be applied from the output of gate G83 on line SS to the sequence control counter to start the sequence which controls the storage of data in the storage unit 200.

The sequence control circuit 260 is made up primarily of a sequence control counter and a called/calling control counter. The sequence control counter receives clock pulses on input line C which are gated through gate G85 when enabling input is received on line SS from the scanner via gate G87 and one of the control inputs SN or RO from the program control indicate a request to store a number or read out a number. The clock pulses applied through the gate G85 advance the sequence control counter whose binary output is converted in the binary to decimal converter to provide a sequential decimal output. Various outputs of the binary to decimal converter are utilized for the sequence control signals WO, WI, RE, D12 and D34.

The called/calling control counter is controlled by the connection of ground to the control leads SN and RO from the program control. The enabling of these leads will produce an alternate actuation of the counter to provide first an output on lead CLD and then an output on lead CLG.

Figure 6:
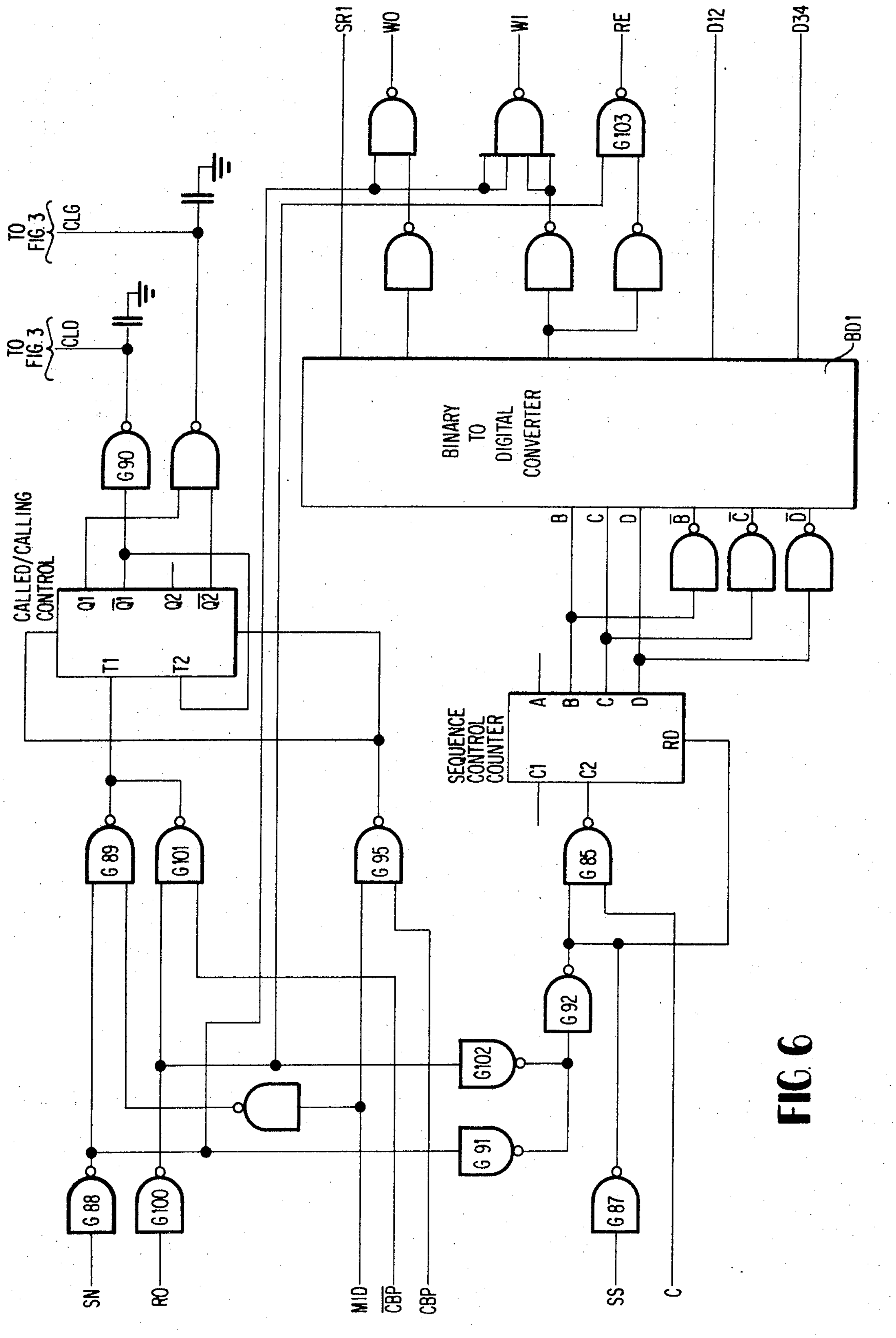
FIG. 6 is a schematic circuit diagram of the sequence control.

At the time the program control desires to store a number in the storage unit 200, ground will be placed on the input control SN to the sequence control 260 (FIG. 6) which will be applied via gates G88 and G89 to the called/calling control counter placing ground on lead CLD at the output of gate G90. The high at the output of gate G88 will also be applied through gates G91 and G92 to enable the gate G88 along with the output of gate G87, thereby permitting clock pulses to be applied to the sequence control counter. The outputs necessary to sequence the storage of data in the storage unit 200 are then generated at the output of the binary to decimal converter.

As soon as the numbers are stored in the memory, the program control places a high on lead MID setting the STORE FULL FLIP-FLOP via gates G93 and G94. This high on lead MID will also reset the called/calling control counter via gate G95 in FIG. 6. Once every minute, a pulse is applied to the lead CNT of each store control from a conventional counter (not shown), and if the STORE FULL FLIP-FLOP is set, the gate G96 will be enabled permitting the setting of the DEMAND FLIP-FLOP. Each pulse on lead CNT will also advance the 15-minute counter via gate G97.

The set DEMAND FLIP-FLOP generates a signal CBD which is interpreted by the program control as a call-back demand. This signal will also start the scanner via gate G98 to scan the respective store control circuits 210–240. When the pulse SC1, for example, is received at the input of gate G99 via line 175 in the store control, this gate will be enabled by the set output of the DEMAND FLIP-FLOP and the output of gate G93, thereby placing ground on the lead ST1 to the scanner in FIG. 5, generating a signal SS at the output of gate G83 to start the sequence control. The program control will generate a ground at input RO (FIG. 6) which will be applied via gates G100 and G101 to the called/calling control counter, and the output of gate G100 will be applied by gates G102 and G92 to enable gate G85 permitting clock pulses to be applied from line C to the sequence control counter. The sequence control signals at the output of binary to decimal converter will then be applied to the storage unit to steer out the digits stored in the memory in accordance with the ST lead which is actuated. The output of gate G100 will enable gate G103 providing the output RE to the read out circuit in FIG. 7 permitting the reading out of the data from the memory to the gates G40 through G43.

When the call-back program is finished, a high on lead CBP will reset the DEMAND FLIP-FLOP via gate G104. If the connection between subscribers was successful, ground on lead SUC from the program control to the store control will reset the STORE FULL FLIP-FLOP and make the storage location available for other data. If the connection is not successful between the subscribers, the next CNT pulse will generate another CBD output signal which will repeat the above-described process. Each time a signal CNT is generated, the 15-minute counter is advanced via G97 until a count of fifteen is recorded therein. At this time, the 15-minute counter will provide an output via line 180 to automatically reset the STORE FULL FLIP-FLOP so that the store location will be available for another call back.

It can therefore be seen that up to four calls stored in the storage unit 200 will be sequentially scanned and read out to the digit store at 1-minute intervals for a period of 15 minutes each or until the calling and called line circuits become available.

When the calling line number is received in the digit store, both the called and calling lines are checked for their busy/idle condition. If both lines are idle, a junctor 115 is selected by the system and a connection is set up therefrom to the calling line. The called line is then rescanned and a connection is set up to the called line from the junctor. The common control then instructs the junctor to first ring the calling line. After the calling line is answered, the junctor then rings the called line and a connection is established therebetween through the junctor when the called party answers.

Since the calling part must first respond to the effort to establish a connection between the parties before the called subscriber will be contacted, no connection will be set up if the calling party does not answer. In this case, it is presumed that the calling party has decided to abandon the call (has left the immediate area of his telephone) and the data pertaining to the call will be specifically erased from the call-back store.

While we have shown and described one embodiment in accordance with the present invention, it is understood that the same is not limited thereto, but is susceptible of numerous changes and modifications as known to a person skilled in the art, and we therefore do not wish to be limited to the details shown and described herein but intend to cover all such changes and modifications as are obvious to one of ordinary skill in the art.

We claim:

1. In an automatic telephone system including a plurality of line circuits, connecting means for interconnecting said line circuits, digit store means for storing dialed subscriber digits, line scanner means for detecting the busy-free condition of said line circuits and program control means for actuating said connecting means in response to indications from said line scanner means, an automatic call-back system comprising a storage unit capable of simultaneously storing a plurality of pairs of calling and called subscriber numbers in respective storage locations, store control means associated with each storage location of said storage unit for indicating whether data is stored therein, scanning means responsive to said program control means for periodically scanning said store control means, and sequence control means responsive to said scanning means and said program control means for effecting sequenced storage of data from said line scanner means in said storage unit and sequenced read-out of data from a storage location to said digit store means.

2. The combination defined in claim 1, wherein said store control means each include store-full indicator means responsive to the storage of data in an associated storage location of said storage unit for generating a first signal indicative of such condition, and demand control means responsive to receipt of said first signal for periodically applying a second signal to said program control means requesting actuation of said scanning means.

3. The combination defined in claim 2, wherein said store control means each further include demand gating means responsive to a scanning signal from said scanning means and said demand control means generating said second signal for applying a stop scan signal to said scanning means.

4. The combination defined in claim 3, wherein said scanning means include a scanner generating scanning signals successively on respective lines to each of said store control means in response to the application of clock pulses thereto, and scanner gating means responsive to a stop scan signal for stopping said scanner, thereby maintaining a scanning signal on one line to a given store control means.

5. The combination defined in claim 4, wherein said storage unit includes a memory having a plurality of bit storages identified by the X-Y coordinates thereof, X conductors and Y conductors for accessing said bit storage upon coordinate energization thereof, write-in means for sequentially applying data bits to said memory in response to scanning of said Y conductors from said sequence control means, said stop scan signal from each store control means being connected to a respective X conductor.

6. The combination defined in claim 5, further including read out circuit means for sequentially retrieving data bits from said memory in response to scanning of said Y conductors from said sequence control means.

7. The combination defined in claim 4, wherein said scanning means further includes means for connecting said stop scan signal to said sequence control means to effect actuation thereof.

8. The combination defined in claim 7, wherein said sequence control means includes a sequence counter responsive to said stop scan signal and applied clock pulses for generating a sequence of control signals capable of steering the digits of one subscriber number to or from said storage unit, and calling/called control means for generating a called control signal during a first generation of said sequence of control signals and a calling control signal during a second generation of said sequence of control signals.

9. The combination defined in claim 8, wherein said storage unit includes a memory having a plurality of bit storages identified by the X-Y coordinates thereof, X conductors and Y conductors for accessing said bit storages upon coordinate energization thereof, write-in means for sequentially applying data bits representing a called line number to said memory in response to receipt of a called control signal and said sequence of control signals from said sequence control means and for applying data bits representing a calling line number to said memory in response to receipt of a calling control signal and said sequence of control signals from said sequence control means.

10. The combination defined in claim 3, wherein said store control means each further includes a maximum time counter which is advanced in count each time a second signal is generated by said demand control means and connected to de-actuate said store-full indicator means upon reaching a maximum count, thereby preventing generation of said first signal after expiration of a given time period.

11. An automatic telephone system comprising a plurality of subscriber line circuits, connecting means for interconnecting line circuits through a junctor, register means for receiving a called subscriber number in the form of line impulses from said junctor and for applying ringing signals through said junctor to said line circuits, line scanner means for detecting the busy-free condition of said line circuits and providing the calling subscriber number of a calling line circuit, digit store means for storing said calling and called subscriber numbers received from said line scanner means and said register means, respectively, call-back circuit means for providing automatic call-back, and program control means responsive to detection of a special feature signal from a calling subscriber subsequent to receipt in said register means of a called subscriber number for effecting storage of said calling and called subscriber numbers from said digit store means in said call-back circuit means, wherein said call-back circuit means includes a storage unit capable of simultaneously storing a plurality of pairs of calling and called subscriber numbers in respective storage locations, store control means associated with each storage location of said storage unit for effecting a periodic transfer of the calling and called subscriber number in each storage location to said digit store, and scanning means responsive to said program control means for periodically scanning said store control means to detect the availability of a storage location in said storage unit and the request for call-back processing in connection with a storage location storing a pair of subscriber numbers, said line scanner means being responsive to said program control means for testing the busy-free condition of the line circuits designated by the calling and called subscriber numbers received by said digit store from said call-back circuit means.

12. The combination defined in claim 11, wherein said program control means includes means responsive to an indication from said line scanner means that both calling and called subscriber line circuits corresponding to subscriber numbers stored in said digit store means are free for first actuating said register means to apply ringing signals to the calling line circuit via said connection means and then to effect connection of said calling and called line circuits only upon receipt of an off-hook line indication from said calling line circuit.

13. The combination defined in claim 12, wherein said store control means in said call-back circuit means includes call-back demand means responsive to a signal from said program control means indicating completion of a connection between calling and called line circuits for preventing further transfer of the subscriber numbers of said line circuits from a storage location of said storage unit to said digit store means.

14. The combination defined in claim 13, wherein said call-back circuit means further includes sequence control means responsive to said scanning means and said program control means for effecting sequenced storage of data from said line scanner means in said storage unit and sequenced read-out of data from a storage location to said digit store means.

15. The combination defined in claim 14, wherein said store control means each includes store-full indicator means responsive to the storage of data in an associated storage location of said storage unit for generating a first signal indicative of such condition, and demand control means responsive to receipt of said first signal for periodically applying a second signal to said program control means requesting actuation of said scanning means.

16. The combination defined in claim 15, wherein said store control means each further includes demand gating means responsive to a scanning signal from said scanning means and said demand control means generating said second signal for applying a stop scan signal to said scanning means.

17. The combination defined in claim 16, wherein said scanning means includes a scanner generating scanning signals successively on respective lines to each of said store control means in response to the application of clock pulses thereto, and scanner gating means responsive to a stop scan signal for stopping said scanner, thereby maintaining a scanning signal on one line to a given store control means.

18. The combination defined in claim 17, wherein said storage unit includes a memory having a plurality of bit storages identified by the X-Y coordinates thereof, X conductors and Y conductors for accessing said bit storages upon coordinate energization thereof, write-in means for sequentially applying data bits to said memory in response to scanning of said Y conductors from said sequence control means, said stop scan signal from each store control means being connected to a respective X conductor.

19. The combination defined in claim 18, further including read out circuit means for sequentially retrieving data bits from said memory in response to scanning of said Y conductors from said sequence control means.

20. The combination defined in claim 17, wherein said scanning means further includes means for connecting said stop scan signal to said sequence control means to effect actuation thereof.

21. The combination defined in claim 20, wherein said sequence control means includes a sequence counter responsive to said stop scan signal and applied clock pulses for generating a sequence of control signals capable of steering the digits of one subscriber number to or from said storage unit, and calling/called control means for generating a called control signal during a first generation of said sequence of control signals and a calling control signal during a second generation of said sequence of control signals.

22. The combination defined in claim 21, wherein said storage unit includes a memory having a plurality of bit storages identified by the X-Y coordinates thereof, X conductors and Y conductors for accessing said bit storages upon coordinate energization thereof, write-in means for sequentially applying data bits representing a called line number to said memory in response to receipt of a called control signal and said sequence of control signals from said sequence control means and for applying data bits representing a calling line number to said memory in response to receipt of a calling control signal and said sequence of control signals from said sequence control means.

23. The combination defined in claim 16, wherein said store control means each further includes a maximum time counter which is advanced in count each time a second signal is generated by said demand control means and connected to de-actuate said store-full indicator means upon reaching a maximum count, thereby preventing generation of said first signal after expiration of a given time period.

* * * * *

UNITED STATES PATENT OFFICE

CERTIFICATE OF CORRECTION

PATENT NO. : 3,707,605

DATED : December 26, 1972

INVENTOR(S) : Ernest O. Lee, Jr. and John A. Adams, Jr.

It is certified that error appears in the above-identified patent and that said Letters Patent are hereby corrected as shown below:

Col. 1, line 56 "all-back" should read ---call-back---.

Col. 7, line 64 "W" should read ---$\overline{W}$---

Col. 11, line 48 "CBP" should read ---$\overline{CBP}$---

Signed and Sealed this

*twenty-eight* Day of *October 1975*

[SEAL]

*Attest:*

RUTH C. MASON
*Attesting Officer*

C. MARSHALL DANN
*Commissioner of Patents and Trademarks*